(12) United States Patent
Ling

(10) Patent No.: US 7,932,709 B1
(45) Date of Patent: Apr. 26, 2011

(54) STABLE HIGH EFFICIENCY STEP-UP VOLTAGE REGULATOR WITH FAST TRANSIENT RESPONSE AND ULTRA LOW OUTPUT VOLTAGE RIPPLE

(75) Inventor: Hok Sun Ling, Hong Kong (CN)

(73) Assignee: National Semiconductor Corporation, Santa Clara, CA (US)

( * ) Notice: Subject to any disclaimer, the term of this patent is extended or adjusted under 35 U.S.C. 154(b) by 321 days.

(21) Appl. No.: 12/147,474

(22) Filed: Jun. 26, 2008

(51) Int. Cl.
*G05F 1/575* (2006.01)

(52) U.S. Cl. ...................................... 323/285

(58) Field of Classification Search .................. 363/265, 363/282, 283, 284, 285, 351
See application file for complete search history.

(56) References Cited

U.S. PATENT DOCUMENTS 7,642,758 B2 * 1/2010 Morong et al. ............... 323/206

OTHER PUBLICATIONS

Prior Art #1 Conventional Fixed Frequency PWM Based Boost Converter, Fig. 1A, 1B and Fig. 2, disclosed on Oct. 30, 2007, 2 pgs.
Prior Art #2 Conventional Constant On-Time (COT) based Boost Converter, Fig. 3 and 4, disclosed on Oct. 30, 2007, 3 pgs.

* cited by examiner

*Primary Examiner* — Gary L Laxton

(57) ABSTRACT

A regulator circuit and a method of generating a stable, low-ripple output, step-up or step-down voltage are disclosed. A low ESR (Equivalent Series Resistance) output capacitor is employed to provide low output voltage ripple. A voltage, $-V_{ESRi}$, is generated using information based on an input voltage and the output voltage. $-V_{ESRi}$ is coupled onto an intermediate reference voltage generated by an integrator based on the output voltage and a constant reference voltage, to form another voltage, $V_{REFi}$. $V_{REFi}$ is coupled to an input of a feedback comparator, instead of a plain constant reference voltage, to modulate the duty cycle of a main switch. The output voltage is inputted as a feedback signal to another input of the feedback comparator. $-V_{ESRi}$, is generated using information based on an input voltage and the output voltage in such a way that output voltage is stable without sub-harmonic oscillation.

22 Claims, 13 Drawing Sheets

STABLE HIGH EFFICIENCY STEP-UP VOLTAGE REGULATOR WITH FAST TRANSIENT RESPONSE AND ULTRA LOW OUTPUT VOLTAGE RIPPLE

TECHNICAL FIELD

The present disclosure relates to voltage regulators. In particular, the present disclosure relates to a method and apparatus for a stable step-up regulator with ultra-low output voltage ripple.

BACKGROUND

Most electronic devices, such as digital computers, include a power supply having a regulated output voltage. Typically, semiconductor based electronic devices operate at relatively low DC voltages such as five volts or less. However, much of the electrical energy to power electronic devices is made available at substantially larger voltages. For example, residential electrical power in the United States is nominally rated at 120 volts AC. Also, automotive power is nominally 12 volts DC, which is often subject to relatively high voltage transients during engine start and other changing load conditions.

Power supplies are generally employed to convert the available electrical power to a form usable by the electronic devices. A power supply used to power the electronic device typically includes a voltage regulator to maintain the output voltage within a range of values usable by the electronic device, e.g., five volts plus or minus two percent. If a voltage goes above the usable range of output values, it may damage the semiconductor device. Similarly, if the voltage goes below the range of output values, voltage compliance can be lost on one or more components of the electronic device, which may cause the device to stop operating. Also, changes in the output voltage of a power supply may induce noise into subsequent processing by other electronic devices and components.

A step-up regulator converts an input DC (Direct Current) voltage to another higher output DC voltage. The step-up regulator is useful in applications where a low source voltage is available and it is desired to maintain a stable output voltage higher than the source voltage. For example, the step-up regulators are useful in electronic circuit applications where multiple voltages are required to run different circuits and electrical components. Step-up voltage regulators are typically used in portable and desktop equipment, instrumentation, etc.

Most voltage regulators include at least one voltage reference. The voltage reference provides a reference voltage that is typically compared against the output of the voltage regulator. Feedback circuitry is employed to stabilize the output of the voltage regulator based on the reference voltage. Generally, some resistance is included in the feedback path for stabilization of the output voltage. However, such resistance may also create increased manufacturing costs and operational inefficiencies in the voltage regulator.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present disclosure, the following Detailed Description is intended to be read in association with the accompanying drawings, wherein.

DETAILED DESCRIPTION

The following description is presented to enable a person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present disclosure is not intended to be limited to the embodiments shown, but is to be accorded the widest scope consistent with the principles and features disclosed herein.

Throughout the specification, and in the claims, the term "connected" means a direct electrical connection between the components that are connected, without any intermediate devices. The term "coupled" means either a direct electrical connection between the components that are connected, or an indirect connection through one or more passive or active intermediary devices. The term "circuit" means either a single component or a multiplicity of components, either active or passive, that are coupled together to provide a desired function. Similar reference letters given to resistors and capacitors do not signify that these elements have the same values.

Figure 11:
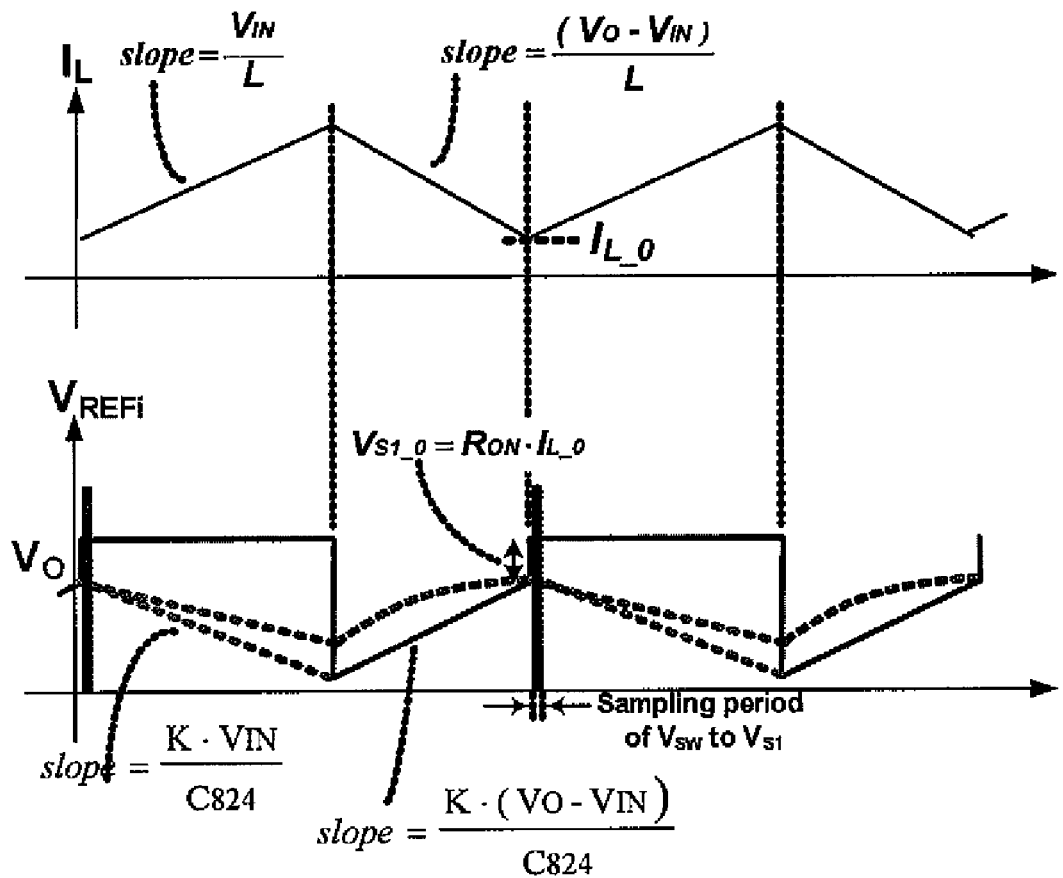
FIG. 11 is a schematic diagram of details of an illustrative generated reference voltage waveform of the circuit of FIG. 8.

Briefly described, aspects of the present disclosure are related to an apparatus and method for generating and regulating a stable low ripple output voltage for use in electronic circuits. To reduce output voltage ripple while maintaining feedback stability, the function of an intrinsic resistance, equivalent series resistance ("ESR"), of an output capacitor of the regulator is replaced with the function of an emulated flywheel current injection control (eFCIC) circuit. The feedback circuit of the regulator generally requires some minimal value of ESR for stability of the output voltage. An injection reference voltage, $V_{REFi}$, substantially equal to the inverse of a voltage across ESR, $V_{ESR}$, is generated by the eFCIC circuit. $V_{REFi}$ is used as a reference voltage for comparison with a feedback output voltage, $V_O$, to control the output voltage $V_O$. $V_{REFi}$ input controls the feedback circuit such that a low ripple output voltage, $V_O$, is produced, as further detailed below. Aspects of the present disclosures provide advantages such as increased power efficiency, reduced manufacturing cost, reduced physical area required, and reduced circuit complexity. In one illustrative embodiment, the voltage regulator is a step-up (boost) regulator. In another illustrative embodiment, the voltage regulator is a step-down (buck) regulator. In yet other illustrative embodiments, other types of regulators, such as buck-boost regulators may be used. Even though the present disclosures are focused on illustrative embodiments of a step-up regulator, the same concepts and techniques may be applied to and used for buck or buck-boost regulators, provided that the characteristics of the current sources 816 and 818 of FIG. 8 and "slopes" shown in FIG. 11 are modified accordingly.

Figure 1:
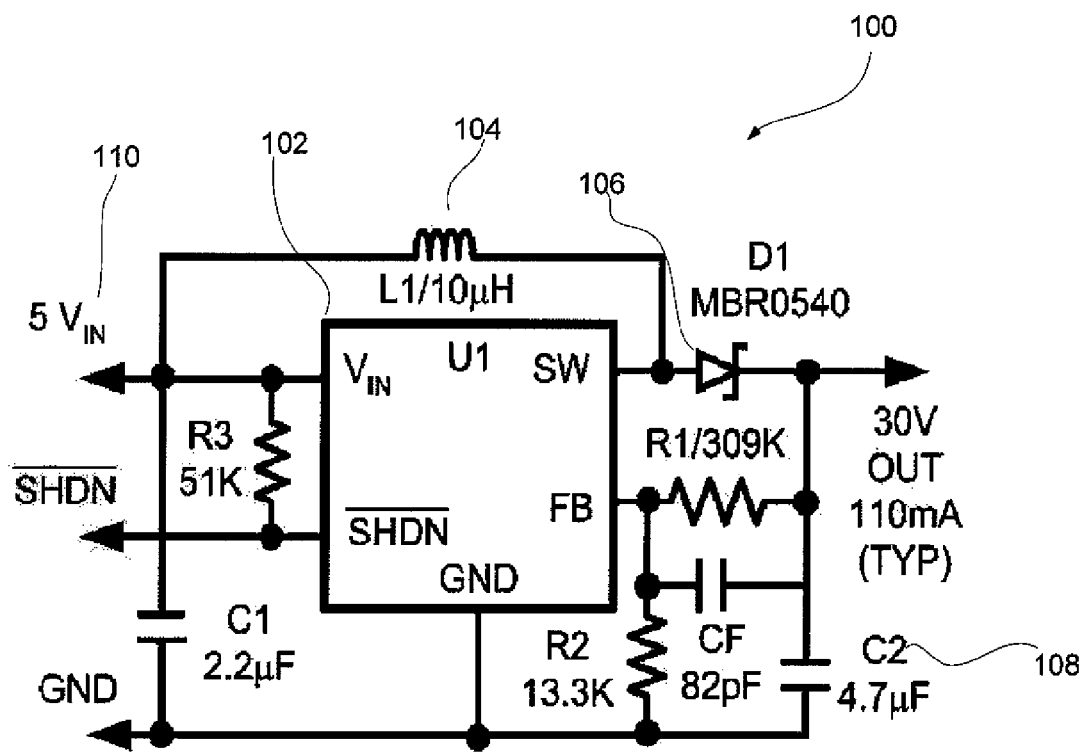
FIG. 1 is a schematic diagram of a known voltage regulator circuit with fixed switching frequency.

FIG. 1 is an example of a step-up voltage regulator 100 known in the industry. A regulator circuit, usually in the form of an integrated circuit ("IC"), 102 is used coupled with some external passive components to produce a stepped up output voltage. For example, a 5V input voltage 110 may be used to produce a 30V output voltage. An inductor 104, a diode 106, and output capacitors, such as capacitor 108 are externally coupled to the IC 102 to generate the desired voltage output. The inductor is used to accumulate electrical energy in an electrical field around the inductor and discharge the accumulated energy to charge the capacitor 108 via the diode 106 during successive portions of a duty cycle, described more fully below.

Figure 2:
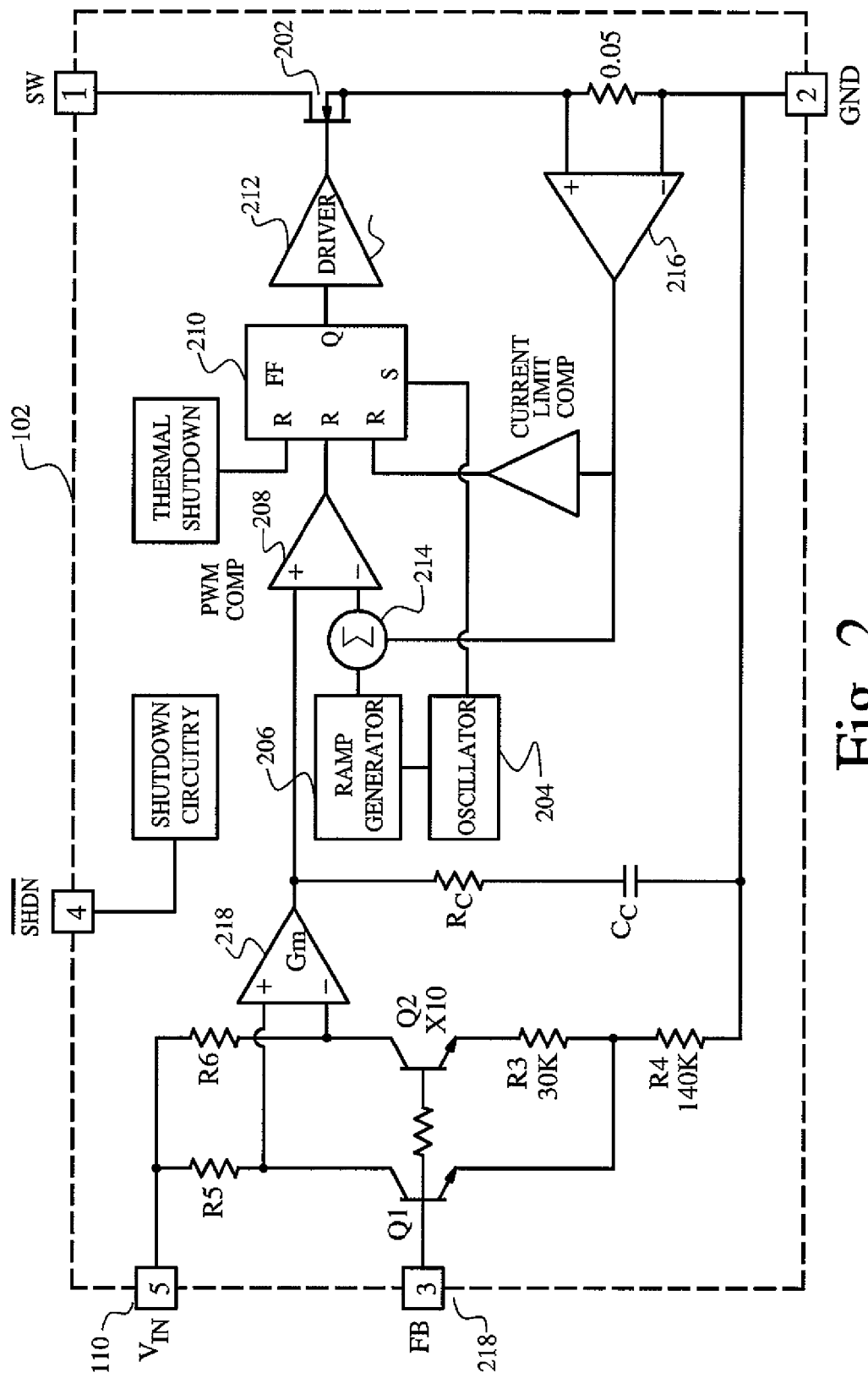
FIG. 2 is a schematic diagram of the details of the known voltage regulator of FIG. 1.

FIG. 2 shows the details of the known circuit of FIG. 1. The circuit of IC 102 includes a main switch 202 which is modulated according to a signal outputted from a flip-flop 210. The flip-flop 210 output signal is generally a square pulse signal with a period and a duty cycle. The duty cycle of a signal is the ratio of a high or active state (ON) of the signal to a low or inactive state (OFF) of the signal, generally expressed as a percentage. For example, a square wave having an ON state of half the period, T, of the wave is said to have a 50% duty cycle. Similarly, an ON state lasting 0.75 of T is said to have a duty cycle of 75%. A pulse width modulation ("PWM") circuit including a comparator 208, an adder 214, a ramp generator 206, and an oscillator 204 are used to set and reset the flip-flop 210, thus, controlling the switching of switch 202 to generate the output voltage of the regulator 100. The switch 202 is generally implemented as a semiconductor switching device, such as a MOSFET (Metal Oxide Semiconductor Field Effect Transistor) or other types of transistors. The detailed operation of this circuit is well-known in the art and will not be further described in this specification.

Figure 3:
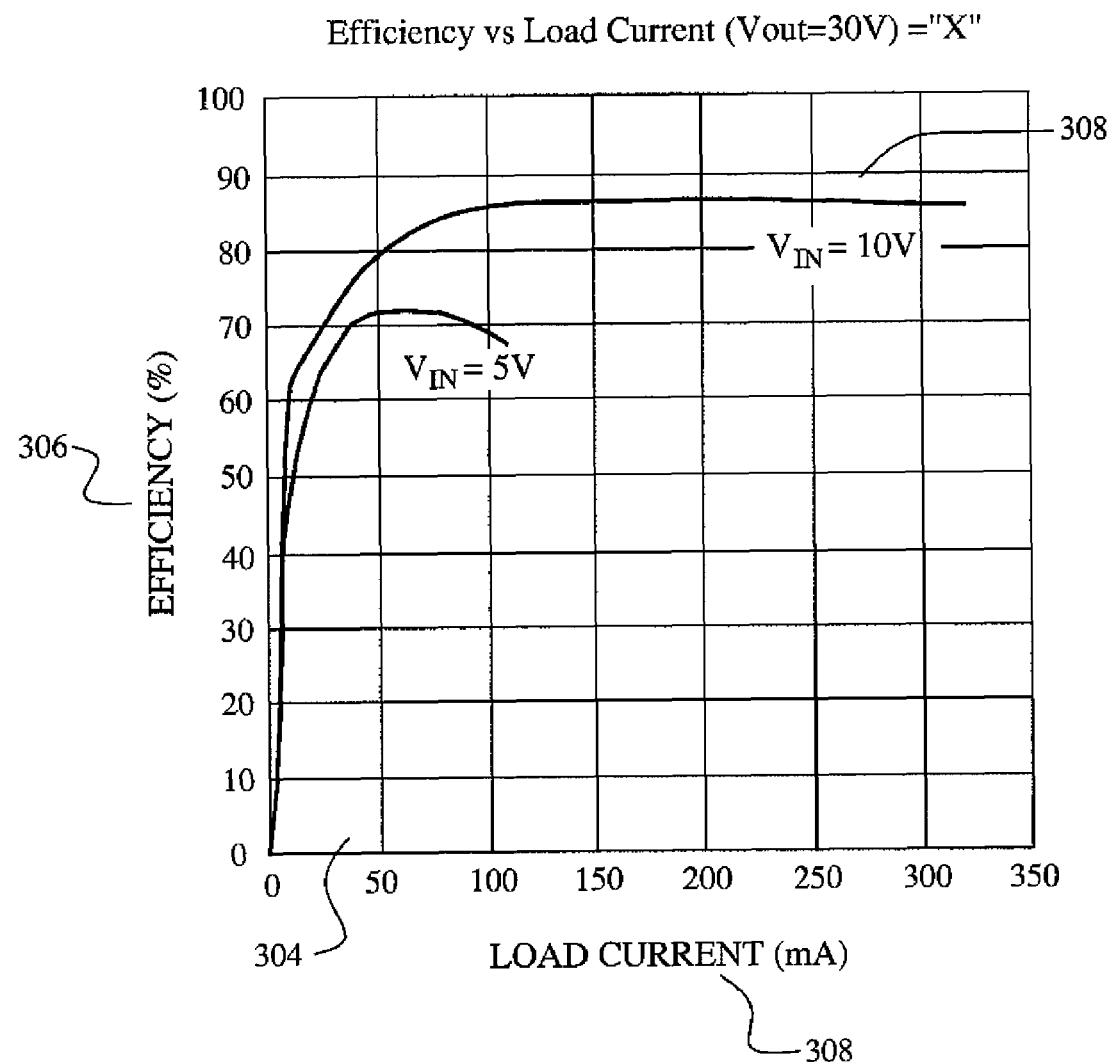
FIG. 3 is an illustrative data graph showing the efficiency of the circuit of FIG. 1.

The circuit of FIG. 2 has a fixed switching frequency as determined in part by the oscillator 204, while the duty cycle is variable based on output voltage feedback through input 218. This type of operation creates a fixed switching loss for circuit 100. As such, during low output load conditions, the circuit 100 continues to consume a fixed amount of power during switching, making the power consumption relatively high compared to the output load demand, causing overall low efficiency for the circuit 100. FIG. 3 shows an example of the low efficiency of this circuit at low load conditions 304. In this example, when the load current 308 is below 50 mA, the efficiency 306 is about 20-80%, which is significantly lower than the efficiency at higher load conditions above 50-100 mA of load current 308, where the efficiency curve 302 approaches 90%.

Figure 4:
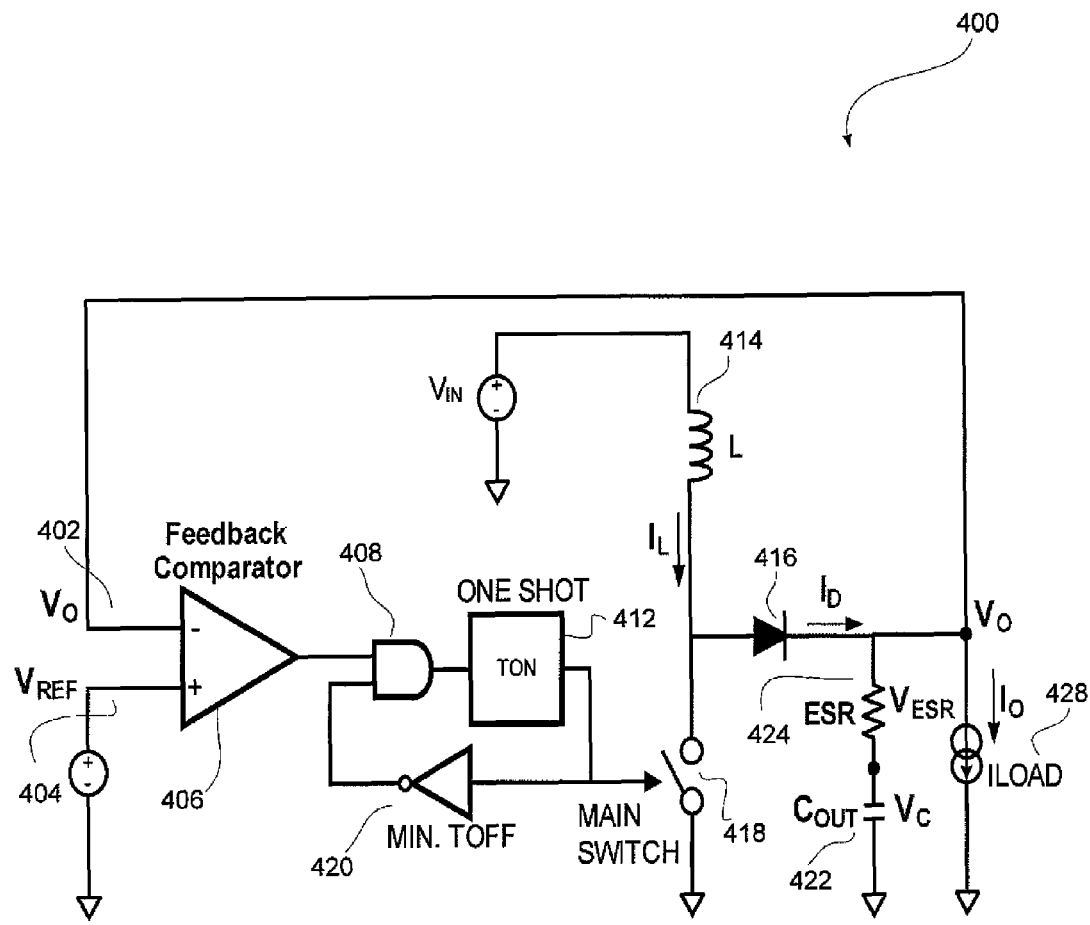
FIG. 4 is a schematic diagram of another known voltage regulator circuit with variable switching frequency and fixed ON time.

Another known improved circuit 400 is shown in FIG. 4, where a one-shot device 412 is used to create a variable switching frequency while maintaining a fixed-period ON state for a main switch 418. Circuit 400 is also known as a constant ON-time step-up regulator. This circuit further includes an input voltage $V_{IN}$ connected to an inductor 414, which is, in turn, coupled to a diode 416. The output of the diode 416 is coupled with an output capacitor 422 having an intrinsic resistance, ESR 424, where an output voltage $V_O$ is obtained. The inductor 414 is further coupled with the main switch 418, which is controlled by an output of the one-shot 412. The output of the one-shot 412 is fed back to itself, via an AND gate 408. The other input of the AND gate 408 is coupled to an output of a feedback comparator 406. The inverting input 402 and non-inverting input 404 of the comparator 406 are coupled with $V_O$ and a reference voltage $V_{REF}$, respectively.

Figure 5:
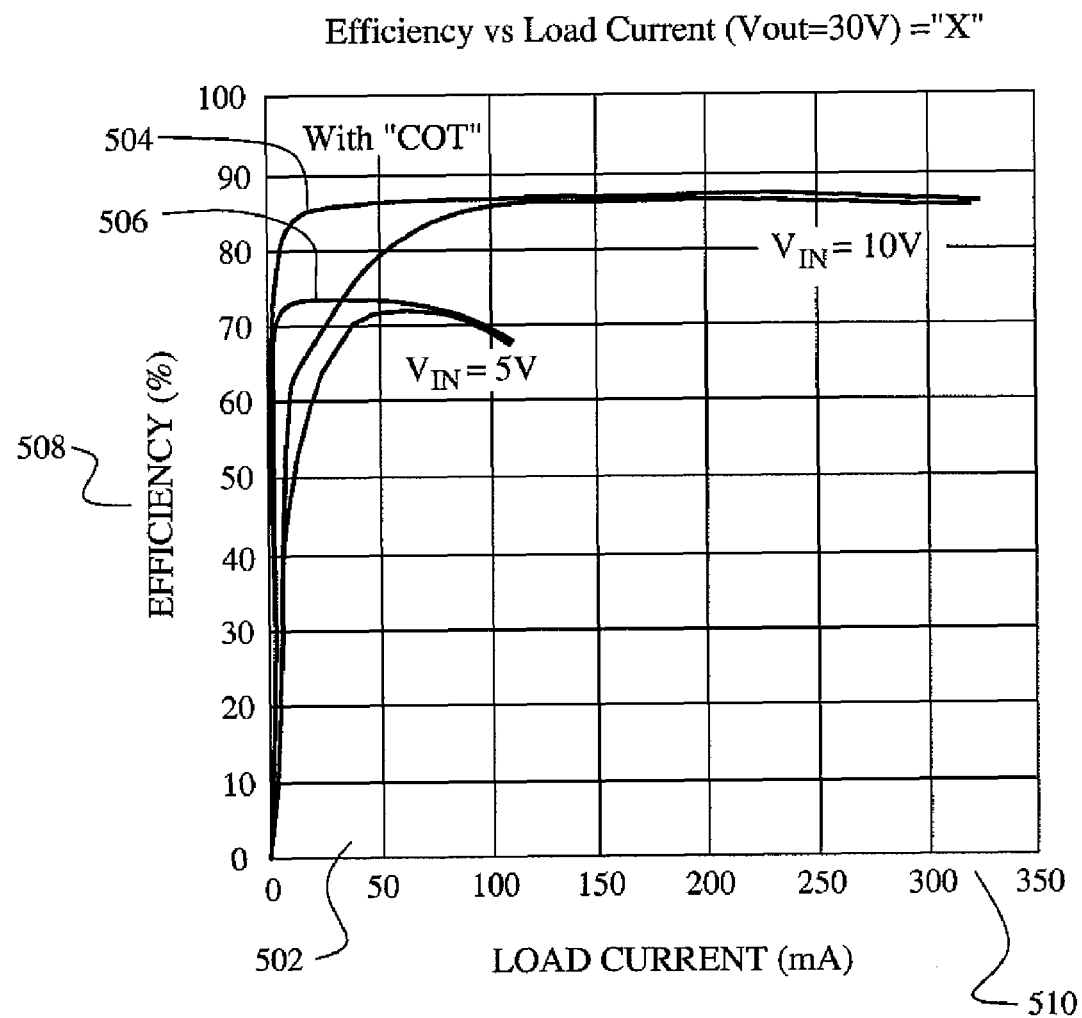
FIG. 5 is an illustrative data graph showing the efficiency of the circuit of FIG. 4.

As described more fully below with respect to FIGS. 4 and 6(a)-(f), the switching frequency and duty cycle of the circuit 400 are variable. With reference now to FIG. 5, because of the variable power frequency, the consumed power during low output load conditions is proportionally lower, causing the efficiency to be higher during low load conditions. For example, during the low load conditions 502, where the load current is below 50 mA, the efficiency curves 506 and 504 have substantially the same values as during higher load conditions, where the load current is above 50-100 mA, namely, about 70% and 90%, respectively. Thus, circuit 400 substantially improves power efficiency during low output load conditions compared to circuit 100.

Figure 6:
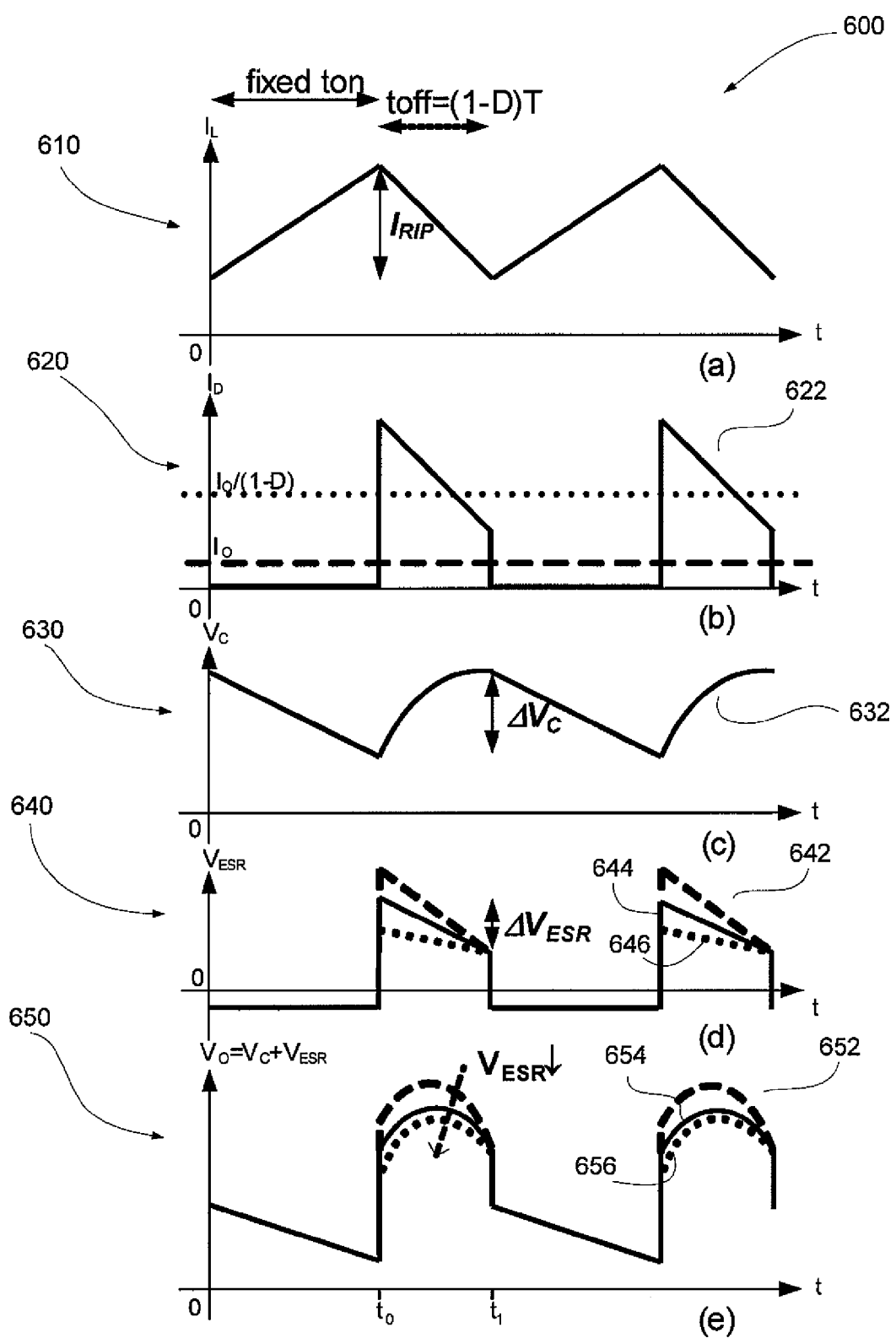
FIGS. 6(a)-(f) show schematic diagrams of output signal waveforms at various points in the circuit of FIG. 4.

With reference now to FIGS. 4 and 6(a)-(f), in operation, the circuit 400 modulates or controls the main switch 418 with a continuously variable frequency based on feedback from the $V_O$ and the $V_{REF}$. A buffer 420, coupled to the output of the one-shot 412, provides a delay that creates a minimum time for the OFF state of the switch 418. The one-shot 412, as well-known in the art, outputs a fixed-duration square pulse, providing the fixed-period ON state for the switch 418. Because no oscillator is employed in the circuit 400, the switching frequency is determined entirely by $V_O$ feedback to the comparator 406. With reference to FIG. 6(a), a profile 610 shows the inductor 414 current versus time. When the switch 418 is in the ON state (closed), the inductor 414 current increases linearly until the main switch 418 transitions to the OFF state (open). At this point, the inductor 414 current decreases until the end of the switching cycle period, T. As noted above, the ON state continues for a fixed duration determined by the one-shot 412. FIG. 6(b) shows a profile 620 of the diode current, $I_D$, during the same switching cycle period T. During the ON state of the switch 418, $I_D$ is shorted out and is substantially equal to zero. At the time of transitioning from the ON state to the OFF state, when the short circuit is suddenly removed by opening the switch 418, the inductor 414 reverses voltage polarity when its field collapses and $I_D$ spikes up momentarily, charging up the output capacitor 422. When the switch 418 is in the OFF state, $I_D$ drops linearly as it continues to charge the output capacitor 422 at a decreasing rate.

A profile 630 of FIG. 6(c) shows the voltage across the output capacitor 422, $V_C$, that varies according to the charging current $I_D$ as discussed above. The output capacitor 422 discharges during the ON state, supplying the load 428 current for the circuit load. During the OFF state, the output capacitor 422 is charged up by $I_D$ until the end of T. The charge and discharge cycles of the output capacitor 422 create a voltage ripple $\Delta V_C$, as shown. FIG. 6(d) shows a profile 640 of the voltage across ESR, $V_{ESR}$ as it varies according to the charging and discharging of the output capacitor 422. The profile of $V_{ESR}$ substantially follows the profile of $I_D$ shown in FIG. 6(b) as the current $I_D$ flows through ESR charging the output capacitor 422. This is because, as is well-known in the art, the voltage across a resistor and the current through the resistor are linearly related by Ohm's law: V=IR. During the ON state, $V_{ESR}$ has reverse polarity while the output capacitor 422 is supplying the load 428 current through the ESR. During the OFF state when the output capacitor 422 is being charged by $I_D$, $V_{ESR}$ has the same polarity as $V_C$. Curves 642, 644, and 646 are discussed below.

Figure 6F:
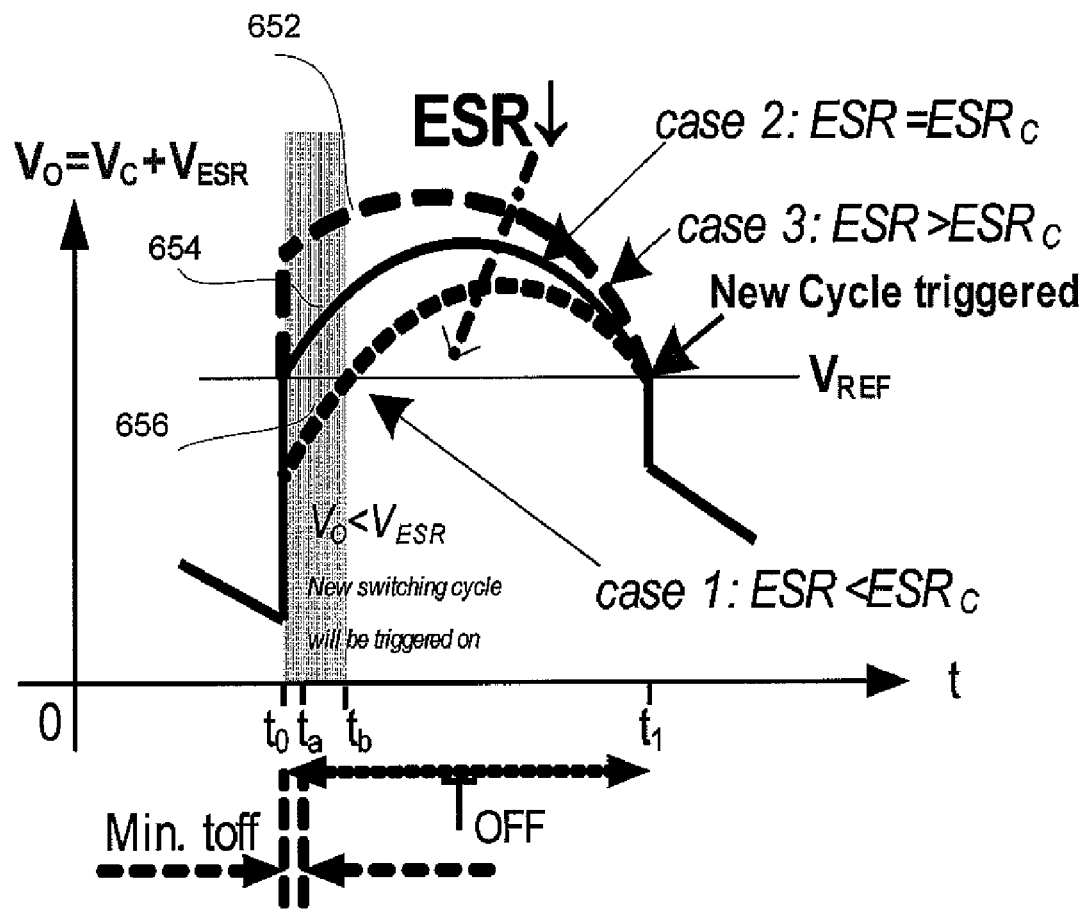

FIGS. 6(e) and 6(f) show a profile of $V_O$, which closely tracks $V_{ESR}$ and $V_C$, since $V_O = V_C + V_{ESR}$. The three curves 652, 654, and 656, as with the curves 642, 644, and 646 shown in FIG. 6(d), depict three cases based on a critical threshold value of ESR, $ESR_C$. In case 1, where $ESR < ESR_C$, the circuit is unstable because $V_O < V_{REF}$ and comparator 406 is triggered enabling a new duty cycle prematurely. This condition, illustrated by curves 646 and 656, creates low voltage ripple (peak-to-peak $V_O$) and also creates sub-harmonic oscillations in the switching frequency, causing instability. In case 2, where $ESR = ESR_C$, the circuit operates stably and with minimal output voltage ripple, as illustrated by curves 644 and 654. In case 3, where $ESR > ESR_C$, the circuit operates stably, but with output voltage ripple greater than in case 2, as illustrated by curves 642 and 652. Therefore, case 2 provides the optimal stable operating condition with minimal output voltage ripple and fast transient response given the stability requirement. From FIGS. 4, 6(c), and 6(d), when $ESR = ESR_C$, we have:

$$\Delta V_{ESR} = \Delta V_C$$

$$I_{RIP} \cdot ESR_C = \left[\frac{I_O}{(1-D)} - I_O\right] \cdot \frac{(1-D)T}{C_{OUT}}$$

$$\Rightarrow I_{RIP} \cdot E_{SRC} = \frac{D \cdot T \cdot I_O}{C_{OUT}}$$

where D is Duty cycle and T is period. And to ensure stability:

$$ESR \geq ESR_C = \frac{T_{ON}}{C_{OUT}} \times \frac{I_O}{I_{RIP}}$$

Figure 7:
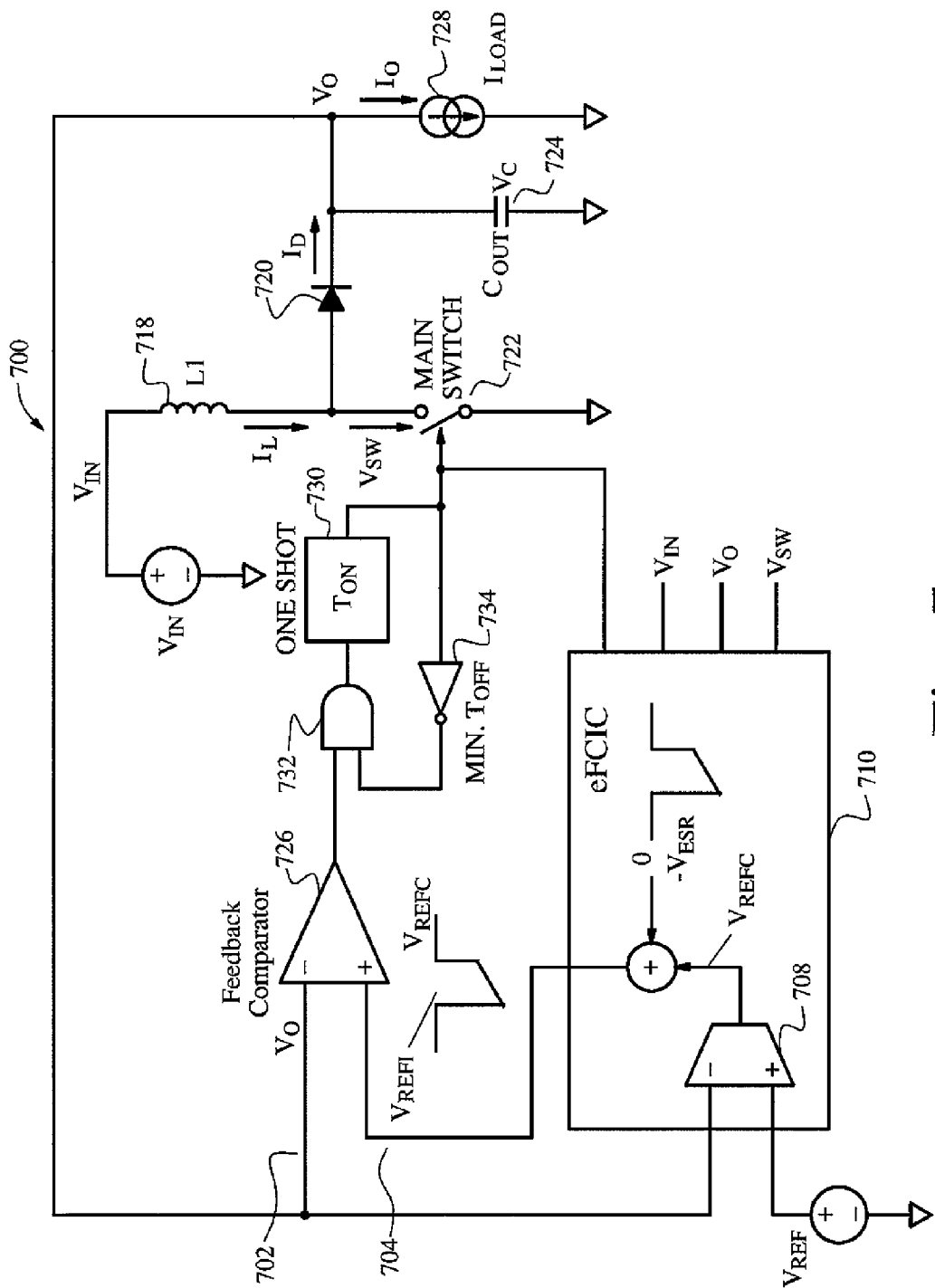
FIG. 7 is a schematic diagram of an illustrative embodiment according to aspects of the present invention.

From the description of $ESR_C$ and the three operational cases above, it is clear that some value of $ESR = ESR_C$ is required for stable circuit operation. If an output capacitor 422, such as a ceramic capacitor, is used that has no ESR or an ESR value of less than $ESR_C$, then the circuit will fall into case 1 and will be unstable. However, ceramic capacitors are desirable for manufacturing and cost reduction purposes. As noted above, to maintain stability while reducing or minimizing output voltage ripple in circuit 400, an eFCIC circuit is used to compensate for a lack of ESR or a value of ESR less than $ESR_C$. FIG. 7 shows an illustrative embodiment of a step-up regulator circuit 700 using an eFCIC circuit 710. The eFCIC 710 takes as input, $V_{IN}$, $V_O$, $V_{SW}$, and $V_{REF}$, and outputs $V_{REFi}$ for input to the feedback comparator 726. eFCIC 710 generates the $V_{REFi}$ signal which is substantially similar to an inverted $V_{ESR}$ depicted in FIG. 6(d). In one illustrative embodiment, other circuit components are similar to those shown in FIG. 4. These components include feedback comparator 726, AND gate 732, one-shot 730, buffer 734, switch 722, inductor 718, diode 720, and output capacitor 724. The operation of the circuit with respect to these components is substantially as described above with respect to FIG. 4 and is not further described here.

Those skilled in the art will appreciate that many types of components and technologies may be used in different embodiments without departing from the spirit of the present disclosures. For example, the switch 722 may be implemented using any suitable transistor such as JFET (Junction Field Effect Transistor), MOSFET (Metal Oxide Semiconductor Field Effect Transistor), bipolar, GaAs (Gallium Arsenide), etc., or other switching devices, depending on the application and design constraints. Similarly, the logic gates, such as AND gate 732, buffers, and comparator 726 may be implemented using any suitable IC's (Integrated Circuit).

Figure 8:
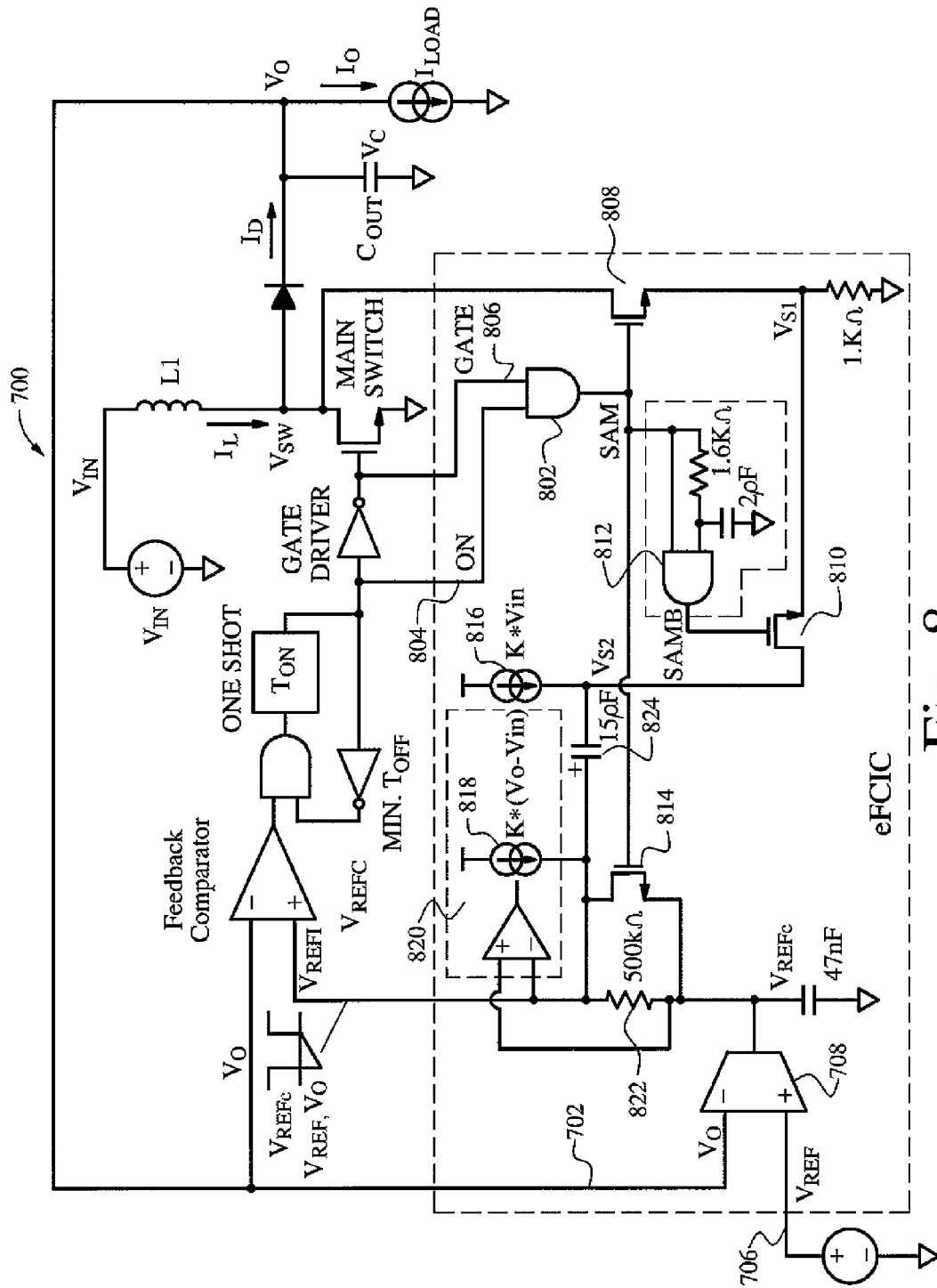
FIG. 8 is a schematic diagram of the details of the illustrative embodiment shown in FIG. 7.

FIG. 8 shows the details of an illustrative embodiment of the eFCIC circuit 710. The eFCIC circuit 710 includes an integrator 708 taking a constant $V_{REF}$ at the non-inverting input 706 and $V_O$ feedback at the inverting input 702. Integrator 708 outputs a $V_{REFc}$ signal input to a comparator 820 via a resistor 822. The comparator 820 controls a current source 818. Another current source 816 is coupled to a transistor switch 810. The transistor switch 810 is controlled by a NAND gate 812 which outputs a sampling signal SAMB. The input of the NAND gate 812 is coupled to an output of an AND gate 802, also coupled with a gate of another transistor switch 814 connected across resistor 822. The AND gate 802 takes as input the output from the one-shot 730, also coupled to the main switch 722. Those skilled in the art will appreciate that other logic gates or combination of logic gates may be used instead of the NAND gate 812 and the AND gate 802 for performing similar functions without departing from the spirit of the present disclosures.

Figure 9:
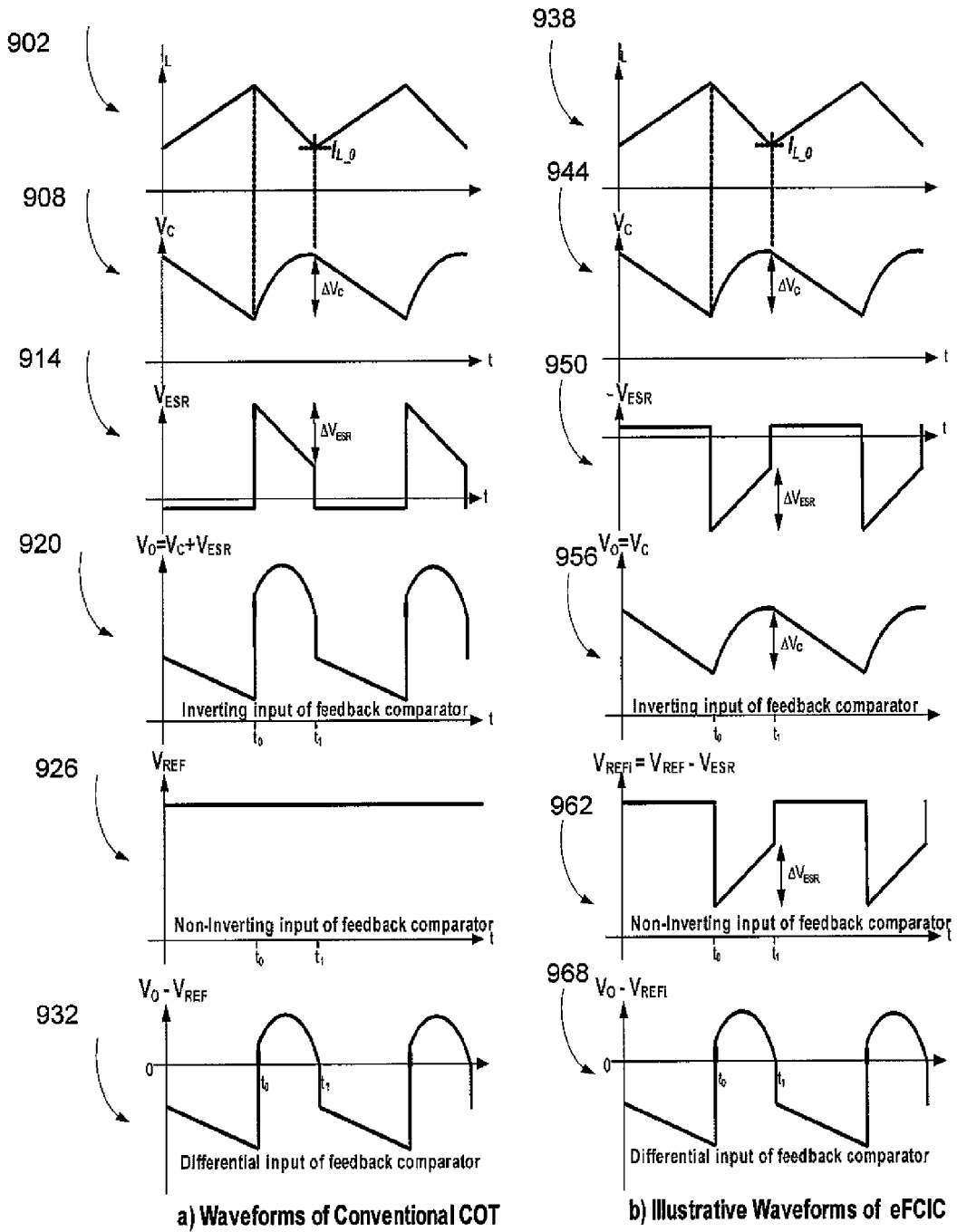
FIG. 9 is a schematic diagram of illustrative output signal waveforms at various points in the circuits of FIGS. 4 and 8.
Figure 10:
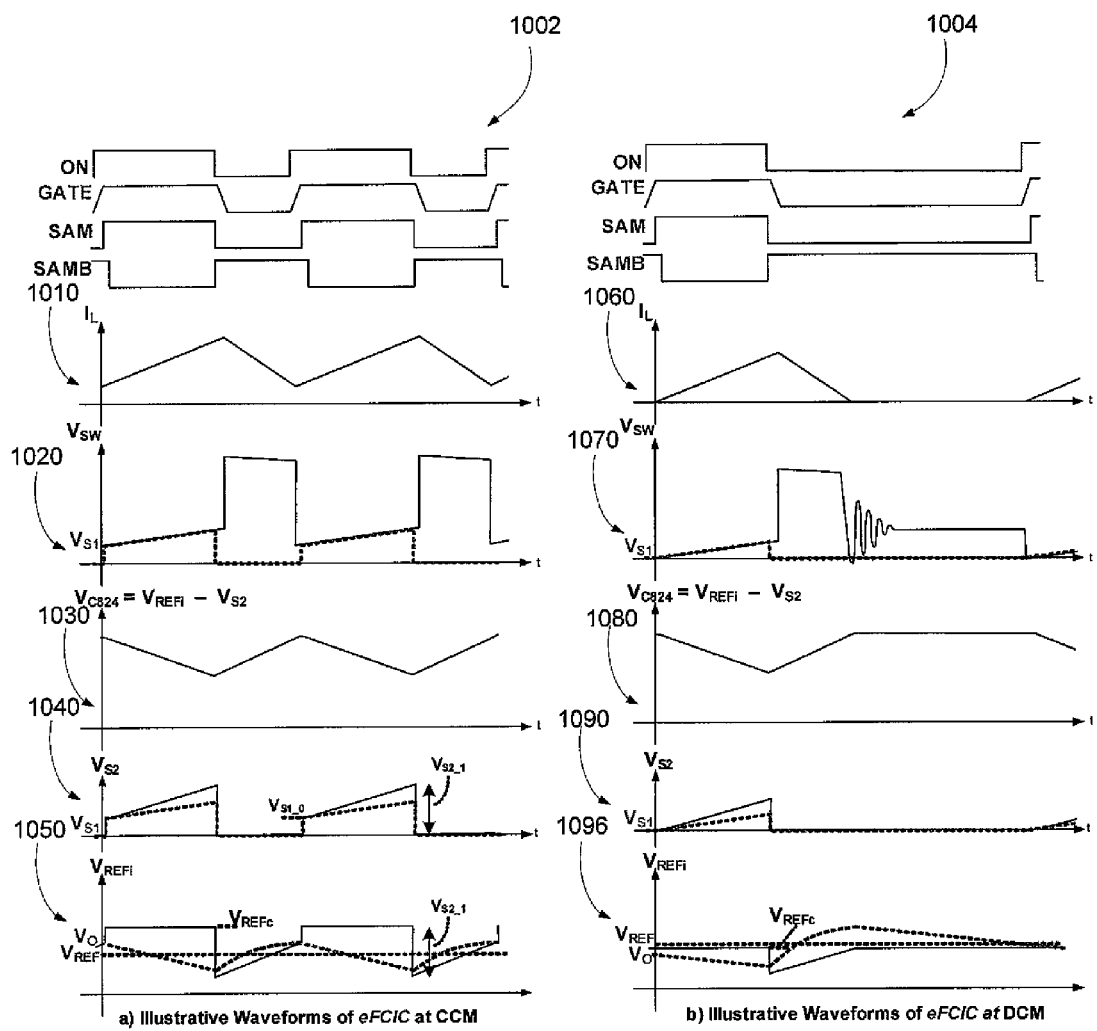
FIG. 10 is a schematic diagram of illustrative signal timings and output signal waveforms at various points in the circuits of FIG. 8.

With reference now to FIGS. 8, 9, and 10, eFCIC circuit 710 generates $V_{REFi}$, which is substantially an inverted $V_{ESR}$, as follows. FIG. 9(a) depicts an illustrative set of wave forms in the shown profiles for the known circuit of FIG. 4 where ESR is used. FIG. 9(b) depicts the corresponding profiles for the illustrative embodiment disclosed in FIG. 8 where the eFCIC circuit 710 is used instead of ESR. Specifically, profiles 902 and 938 depict the $I_L$ curves which are substantially similar. Profiles 908 and 944 depict $V_C$, which are also substantially similar. Profile 914 shows the $V_{ESR}$ waveform while profile 950 depicts the inverse of $V_{ESR}$, $-V_{ESR}$. Profile 920 depicts the $V_O$ waveform of the known circuit. In this profile, $V_O = V_C + V_{ESR}$, as previously noted, causing relatively pronounced ripples in the output voltage as shown. However, profile 956 shows $V_O = V_C$ of the illustrative embodiment of FIG. 8, showing relatively less pronounced ripples in the output voltage because of removal of $V_{ESR}$. Profile 926 depicts a constant $V_{REF}$ for the known circuit. Having a constant $V_{REF}$ at the input to the comparator 406 causes the output of the comparator to be dependent solely on variations of the $V_O$ feedback signal at the inverting input 402. In contrast, profile 962 depicts a variable reference voltage, $V_{REFi} = V_{REF} - V_{ESR}$, where a constant voltage, $V_{REF}$, is added to the inverse $V_{ESR}$, $-V_{ESR}$, essentially generating an offset inverse voltage at the non-inverting input 704 of the comparator 726. This way, the output of the comparator 726 is triggered by variations in $V_{REFi}$ and $V_O$. $V_{REF}$ is essentially a variable current injection control reference voltage used, via the feedback comparator 726, for triggering the one-shot 730 that modulates the main switch 722, thus, controlling injection of the inductor current $I_L$. Finally, profiles 932 and 968 show that the differential inputs seen by the comparators 406 and 726, V$_O$—V$_{REFi}$ and V$_O$—V$_{REF}$, respectively, are substantially identical, resulting in the same overall circuit behavior but with substantially lower output voltage ripple, as depicted in profile 956.

At the beginning of a new duty cycle, the output of the one-shot 730 is ON (active or high), the output of the AND gate 802 goes high, depicted as the SAM (sample) signal in FIG. 10, timing diagram 1002. When SAM goes high, switch 808 is closed and node V$_{S1}$ samples node V$_{SW}$. At the same time, switch 814 is also closed electrically coupling the potential at V$_{REFc}$ to one side of capacitor 824. Typically, the capacitor 824 is selected to be many orders of magnitude, such as 10,000 times, smaller than a capacitor between the output of the integrator 708, labeled V$_{REFc}$ in FIG. 8, and ground. With such relative size difference, V$_{REFc}$ virtually does not change when capacitor 824 discharges. The output of NAND gate 812, SAMB (sample B) is the inverse of SAM for most of the duration of ON state of the main switch 722. As such, switches 814 and 810 have complementary states (i.e., ON/OFF or closed/open) during this time. However, because the two inputs of the NAND gate 812, shown in FIG. 8, have a small relative delay with respect to each other, there is a small window of time where both SAM and SAMB are high (active) and consequently both switches 810 and 814 are closed, electrically coupling V$_{S1}$ to V$_{REFc}$ through the capacitor 824. During this small window of time, the voltage across capacitor 824 is set to [V$_{REFc}$−V$_{S1}$], while, as noted above, V$_{REFc}$ does not change appreciably.

After the falling edge of SAMB, the current source 816 charges up the capacitor 824 and V$_{S2}$ ramps up linearly as shown in FIG. 10, profiles 1050 and 1096. In one illustrative embodiment, the current source 816 depends on V$_{IN}$ based on a simple function such as: I$_{816}$=K×V$_{IN}$, where K is a circuit constant, as further discussed below with respect to FIG. 11. In other embodiments other functions of V$_{IN}$ may be used for I$_{816}$. Next, when the output of the one-shot 730 goes low and the main switch 722 is opened, SAM goes low and switch 814 is opened, electrically decoupling capacitor 824 from V$_{REFc}$. At the same time switch 810 is closed because SAMB is high and V$_{REFi}$ drops sharply compared with V$_{REFc}$. The current source 818 is controlled by the comparator 820 and is turned on when V$_{REFi}$<V$_{REFc}$ to charge up capacitor 824. In one illustrative embodiment, the current source 818 depends on V$_{IN}$ based on the following function: I$_{818}$=K×(V$_O$−V$_{IN}$). In other embodiments other functions of V$_{IN}$ may be used for I$_{818}$. When the main switch is in OFF state (open), V$_O$>V$_{REFi}$ until the next cycle when V$_O$<V$_{REFi}$ and another cycle starts as a result of triggering the output of comparator 726.

The circuit 700 can operate in two modes: continuous conduction mode or CCM, and discontinuous conduction mode or DCM. CCM occurs during high output loading conditions when the duty cycles happen back to back with no cyclic gap in between. DCM occurs otherwise when output loading is low, in effect, reducing switching frequency and saving power. The CCM and DCM modes of operation are illustratively depicted in FIGS. 10(a) and 10(b), respectively. FIG. 10(a) shows waveform profiles for CCM, while FIG. 10(b) shows the same profiles for DCM. Timing diagram 1002 shows some internal signal timings for CCM, as discussed above. Timing diagram 1004 shows the same signal timings for DCM where duty cycles are not repeated back to back but have a gap between cycles. Profiles 1010 and 1060 show illustrative inductor I$_L$ waveforms during the ON/OFF portions of the duty cycle. Profile 1060 shows that during cycle gaps I$_L$ is zero. Profiles 1020 and 1070 show V$_{SW}$, the voltage at the main switch 722. V$_{SW}$ follows V$_C$ plus one diode voltage drop (about 0.7 V) when the main switch 722 is OFF and the diode 720 is conducting, that is: V$_{SW}$=V$_C$+0.7. As such, V$_{SW}$ follows the V$_C$ waveform shown in FIG. 9(b) during the OFF state of the main switch 722. When the main switch 722 is ON (closed), V$_{SW}$=I$_L$×R$_{ON}$, where R$_{ON}$ is the ON-state resistance of the main switch 722. V$_{S1}$ samples V$_{SW}$ when the main switch 722, and subsequently, switch 808 turn ON (closed). V$_{S1}$ pulls down to ground when the main switch 722 turns OFF (opened).

In DCM, the regulator is still switching but at a relatively low frequency compared with CCM, thus contributing to power savings. Generally, the regulator output always has some load. For example, even output capacitor leakage may be considered a light load. The output loading level causes the regulator to operate in DCM or CCM, i.e. DCM for light loading, and CCM for heavy loading. If the loading is light enough for a regulator to operate in DCM, the regulator switches at relatively low frequency and will stay in DCM until the operating conditions change (for example, V$_{IN}$, V$_O$, or loading levels). If the loading becomes heavy enough, the regulator will start operating in CCM, switching with relatively high frequency compared with DCM. The regulator will stay in CCM until the operating conditions change again, for example, loading is decreased.

Profiles 1030 and 1080 show the voltage across capacitor 824 discharging and charging during main switch 722 ON and OFF states, respectively. Profiles 1040 and 1090 show voltage V$_{S2}$ superimposed on V$_{S1}$ as main switch 722 turns ON and OFF. And finally, profiles 1050 and 1096 show V$_{REFi}$ superimposed on the output voltage V$_O$ having small ripples during CCM and asymptotically approaching V$_{REF}$ during DCM.

FIG. 11 shows details of the illustrative V$_{REFi}$ shown in profile 1050 of FIG. 10(a). With reference to FIG. 8, circuit constant K based on the design of current sources 816 and 818 is used to generate V$_{REFi}$. Constant K in conjunction with capacitor 824 generates the same differential input to the feedback comparator 726 as the known step-up regulator circuit 400. Stability of criteria established above with respect to FIG. 6(e) may be fulfilled by proper selection of these circuit values, namely, K and capacitance C$_{824}$ of capacitor 824, as follows.

Based on the discussions above, for stable output, the condition: ΔV$_{ESR}$≧ΔV$_C$, must hold:

With reference to FIG. 11, the attribute $$\frac{K \cdot V_{IN}}{C_{824}} \cdot T_{ON}$$

acts as ΔV$_{ESR}$.

Therefore, as the sufficient criteria for stability:

$$\frac{K \cdot V_{IN}}{C_{824}} \cdot T_{ON} \geq \Delta V_C$$

where $$\Delta V_C = \frac{I_O}{C_{OUT}} \cdot T_{ON},$$

resulting in:

$$\frac{K}{C_{824}} \geq \frac{I_O}{C_{OUT} \cdot V_{IN}}$$

Current sources 816 and 818 are respectively related to the constant K and $V_{IN}$ as:

$$I_{816} = K \cdot V_{IN}, \text{ and}$$

$$I_{818} = K \cdot (V_O - V_{IN})$$

Figure 12:
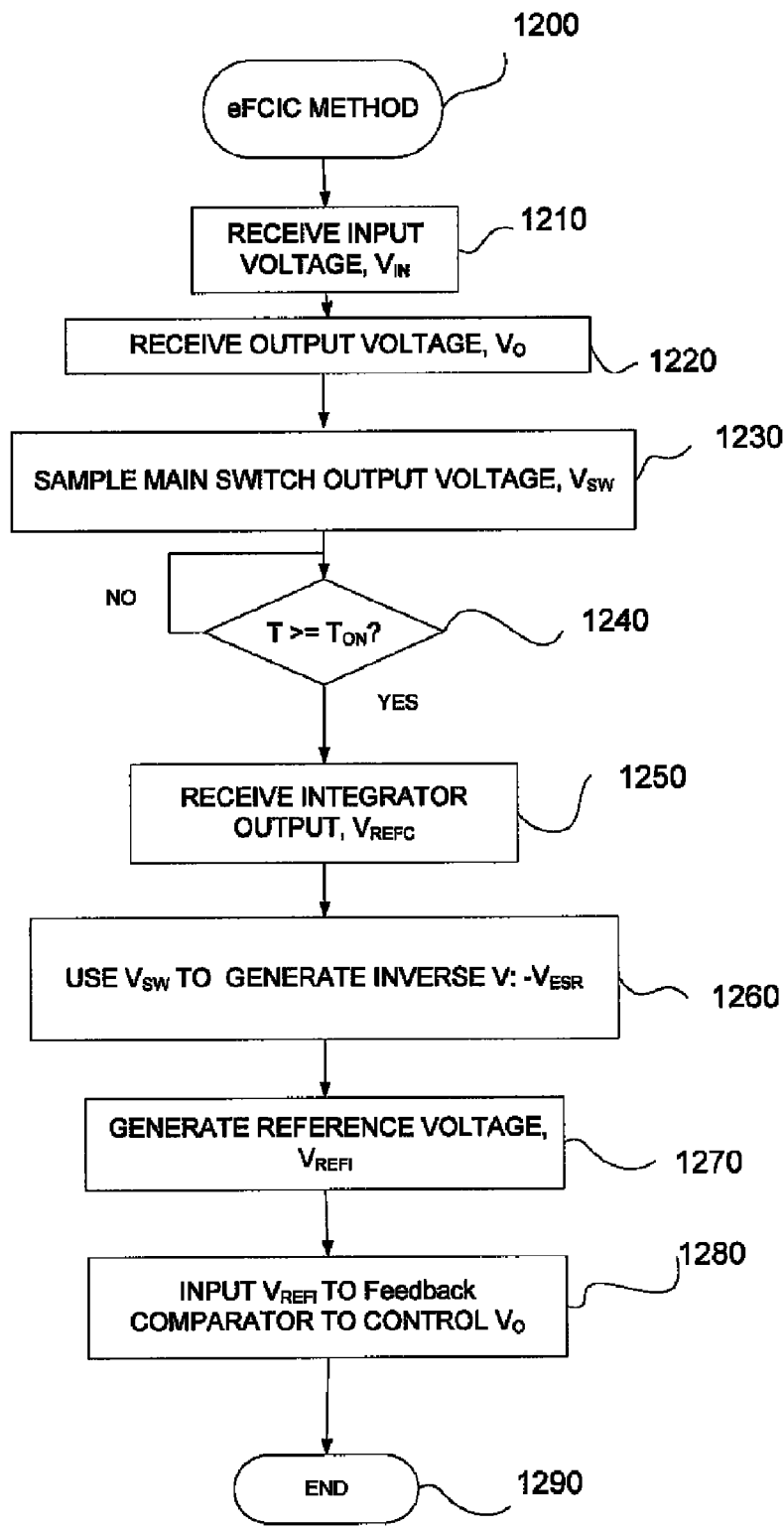
FIG. 12 is a flow diagram of an illustrative method of generating a stable low ripple output voltage according to aspects of the present invention.

Those skilled in the art will appreciate that the illustrative embodiments disclosed in this specification are not the only configurations that can generate an inverse $V_{ESR}$ for input to the comparator 726. Other circuit configurations may be devised for generating $-V_{ESR}$ depending on the application. FIG. 12 shows a general eFCIC method 1200 of achieving low voltage ripple in the output without using ESR. Generally, the input voltage and the output voltage are used to generate the $-V_{ESR}$ for input to the comparator 726 instead of a constant reference voltage. The differential input that the comparator 726 sees is substantially identical to the known implementations where a constant reference voltage is used in conjunction with output voltage feedback to trigger the comparator output and start a switching cycle.

At block 1210 input voltage $V_{IN}$ is received by the regulator circuit 700. In one illustrative embodiment, $V_{IN}$ is also sensed via a dedicated connection and used to control the current sources 816 and 818, which are used to charge up capacitor 824 during different portions of the cycle, as described above. At block 1220 the output voltage $V_O$ is received as an input signal to the integrator 708. $V_O$ is also sensed via another dedicated connection and supplied to the current source 818. Next, at block 1230, $V_{SW}$ is sampled for further processing and generation of $-V_{ESR}$. In this embodiment, $V_{SW}$ is sampled by $V_{S1}$ through switch 808 at the moment that the main switch is turned ON via the one-shot.

At block 1240 and with reference now to FIG. 8, in one illustrative embodiment, the circuit monitors a reference time, t, to determine when $t \geq T_{ON}$. The voltage $V_{S1}$ at an initial reference time, t0, is $V_{S1\_0}$. At some time $t1 = T_{ON}$, the voltage $V_{S1\_1}$ calculated as: $V_{S1\_1} = V_{S1\_0} + K1 \ast V_{IN} \ast T_{ON}$, where K1 is some constant. At time $t1 \geq T_{ON}$ the main switch is turned OFF, resetting reference time back to t0.

At block 1250, integrator output voltage $V_{REFc}$ is received. At block 1260 the flywheel current in inductor 718 is used to charge the output capacitor 724. The sampled voltage at $V_{S1}$ is used to shape and generate $-V_{ESR}$ on a terminal of capacitor 824 using current sources 816 and 818, as described above. At block 1270, in one illustrative embodiment, $V_{REFi}$ is determined as: $V_{REFi} = V_{REFc} - V_{S1\_1} + K1 \ast (V_{OUT} - V_{IN}) \ast t$. Meanwhile, $V_{REFi}$'s maximum value is clamped to be the same as $V_{REFc}$. Thus, $V_{S1\_1}$ is combined with $V_{REFc}$ to generate $V_{REFi}$ for input to the comparator 726. At block 1280 $V_{REFi}$ is input at the non-inverting input of the comparator 726 for control of the injection of flywheel current into the step-up circuit 700 through the modulation of the main switch 722.

What is claimed as new and desired to be protected by Letters Patent of the United States is:

1. A voltage regulator circuit comprising:
   a main switch having a control terminal and an output terminal configured to have a switch voltage;
   a fixed-time output module configured to modulate the control terminal of the main switch;
   an output capacitor configured to provide an output voltage;
   a signal generator configured to generate a variable inverse equivalent series resistance (ESR) voltage using the output voltage and the switch voltage; and
   a comparator having a first input configured to receive the output voltage, a second input configured to receive the variable inverse ESR voltage, and an output operably coupled to an input of the fixed-time output module.

2. The voltage regulator circuit of claim 1, wherein the signal generator comprises at least one current source dependent on an input voltage to the voltage regulator circuit.

3. The voltage regulator circuit of claim 1, wherein the signal generator comprises an integrator having one input configured to receive a constant reference voltage and another input configured to receive the output voltage.

4. The voltage regulator circuit of claim 1, wherein the first and the second inputs to the comparator are configured to receive a differential input that is substantially the same as a differential input to a comparator of a constant on-time regulator circuit having an output capacitor with ESR.

5. The voltage regulator circuit of claim 1, wherein the signal generator comprises two current sources configured to generate the variable inverse ESR voltage, each current source being dependent on an input voltage to the voltage regulator circuit according to a different function.

6. The voltage regulator circuit of claim 1, wherein the output capacitor substantially lacks an ESR.

7. The voltage regulator circuit of claim 1, wherein the signal generator comprises at least one current source configured to generate the variable inverse ESR voltage, the at least one current source configured to be controlled by a second comparator based on a modified reference voltage and the variable inverse ESR voltage.

8. A circuit for controlling flywheel current injection into a voltage regulator, the circuit comprising:
   an integrator configured to generate a modified reference voltage based on an output voltage and a constant reference voltage;
   a first switch configured to sample a voltage on a main switch of the voltage regulator;
   a capacitor configured to generate a variable inverse equivalent series resistance (ESR) voltage, the capacitor having a first terminal coupled with a current source and a second terminal coupled with the first switch; and
   a second switch configured to couple the modified reference voltage with the first terminal of the capacitor.

9. The circuit of claim 8, further comprising a comparator configured to control the current source based on the modified reference voltage and the variable inverse ESR voltage.

10. The circuit of claim 8, further comprising a third switch configured to couple the second terminal of the capacitor with the sampled voltage obtained by the first switch.

11. The circuit of claim 8, further comprising a logic gate having two inputs, wherein one input is configured to receive a delayed version of a signal received by the other input, the logic gate coupling a control terminal of the first switch with a control terminal of the second switch such that when the first switch is open, the second switch is closed.

12. The circuit of claim 8, wherein the first and the second switches are MOSFET transistors.

13. The circuit of claim 8, further comprising a second current source coupled with the second terminal of the capacitor.

14. The circuit of claim 8, wherein the current source is dependent on an input voltage to the voltage regulator based on a function: $I = K \times (V_{OUT} - V_{IN})$, where I is a current of the current source, K is a circuit constant, $V_{OUT}$ is an output voltage of the voltage regulator, and $V_{IN}$ is the input voltage to the voltage regulator.

15. The circuit of claim 8, wherein the voltage regulator is a step-up voltage regulator.

16. The circuit of claim 8, wherein the voltage regulator is a step-down voltage regulator.

17. A method of regulating an output voltage with ultra low ripple, the method comprising:
  receiving an input voltage coupled with an inductor that is used for injecting current into a circuit loop;
  generating an output voltage using an output capacitor substantially lacking equivalent series resistance (ESR);
  sampling a switch voltage;
  generating a current injection control reference voltage based on the sampled switch voltage and a constant reference voltage; and
  comparing, via a feedback loop, the current injection control reference voltage with the output voltage to control a level and a ripple voltage of the output voltage.

18. The method of claim 17, wherein generating the current injection control reference voltage comprises using a capacitor coupled with a current source.

19. The method of claim 17, further comprising using an integrator to generate an intermediate reference voltage based on the output voltage and the constant reference voltage.

20. The method of claim 17, wherein generating the current injection control reference voltage comprises using two current sources.

21. The method of claim 17, wherein the output capacitor is a ceramic type capacitor.

22. The method of claim 17, wherein sampling the switch voltage comprises using a first switch's control signal to close a second switch coupled with a terminal of the first switch.

* * * * *